US011389724B2

(12) United States Patent
Takafuji et al.

(10) Patent No.: US 11,389,724 B2
(45) Date of Patent: Jul. 19, 2022

(54) NON-TRANSITORY COMPUTER-READABLE MEDIUM, DEVICE, AND METHOD FOR IMAGE GENERATION

(71) Applicant: KOEI TECMO GAMES Co., Ltd., Yokohama (JP)

(72) Inventors: Yuishin Takafuji, Yokohama (JP); Junpei Tsuda, Yokohama (JP)

(73) Assignee: KOEI TECMO GAMES CO., LTD., Yokohama (JP)

( * ) Notice: Subject to any disclaimer, the term of this patent is extended or adjusted under 35 U.S.C. 154(b) by 44 days.

(21) Appl. No.: 16/953,345

(22) Filed: Nov. 20, 2020

(65) Prior Publication Data
US 2021/0154582 A1  May 27, 2021

(30) Foreign Application Priority Data

Nov. 21, 2019  (JP) .............................. JP2019-210737

(51) Int. Cl.
*A63F 13/573* (2014.01)
*A63F 13/56* (2014.01)

(52) U.S. Cl.
CPC ............ *A63F 13/573* (2014.09); *A63F 13/56* (2014.09)

(58) Field of Classification Search
CPC .......... A63F 13/35; A63F 13/44; A63F 13/46; A63F 13/56; A63F 13/573; A63F 13/577;
(Continued)

(56) References Cited

U.S. PATENT DOCUMENTS 6,067,096 A * 5/2000 Nagle ..................... G06T 13/20
345/473
7,148,894 B1 * 12/2006 Hayashi .................. A63F 13/57
345/472
(Continued)

FOREIGN PATENT DOCUMENTS

JP          3569201 B2     12/2001
JP        2007-164721       6/2007
(Continued)

OTHER PUBLICATIONS

Japanese Office Action for JP Application No. 2019-210736, dated Jun. 8, 2021 (w/ English machine translation).
(Continued)

*Primary Examiner* — William H McCulloch, Jr.
(74) *Attorney, Agent, or Firm* — Mori & Ward, LLP

(57) ABSTRACT

A non-transitory computer-readable medium stores an image generation program to perform a method. The method includes determining, in a scene including a timing of a hit of an attack in a battle between characters in a game space, the timing of the hit, and a predetermined portion of a predetermined character and an opponent portion of an opponent character in the battle where the hit will occur, from the predetermined character, the opponent character, and animation data that causes at least the opponent character to perform an action of the battle; calculating a vector from the predetermined portion to the opponent portion at the hit timing; and generating an image of the scene by moving a position of the opponent portion in each frame included in the scene by using the vector such that the opponent portion hits the predetermined portion at the hit timing.

7 Claims, 19 Drawing Sheets

(58) Field of Classification Search
CPC .............. A63F 13/58; A63F 13/833; A63F 2300/6607; G06T 13/40; G06T 2210/21
See application file for complete search history.

(56) References Cited

U.S. PATENT DOCUMENTS

| | | | |
|---|---|---|---|
| 7,275,986 B2* | 10/2007 | Mori | A63F 13/10 463/2 |
| 7,281,981 B2* | 10/2007 | Yotoriyama | A63F 13/10 463/31 |
| 8,070,607 B2* | 12/2011 | Takahashi | A63F 13/42 463/31 |
| 8,202,155 B2* | 6/2012 | Uchiyama | A63F 13/12 463/31 |
| 10,092,846 B2* | 10/2018 | Sogabe | A63F 13/812 |
| 10,105,600 B2* | 10/2018 | Yasuda | A63F 13/25 |
| 10,751,626 B2* | 8/2020 | Wang | A63F 13/58 |
| 10,994,205 B2* | 5/2021 | Takafuji | A63F 13/577 |
| 11,045,732 B2* | 6/2021 | Imai | A63F 13/56 |
| 11,135,512 B2* | 10/2021 | Abe | A63F 13/537 |
| 11,247,124 B2* | 2/2022 | Ota | H04L 63/0884 |
| 2003/0038428 A1* | 2/2003 | Yotoriyama | A63F 13/56 273/440 |
| 2004/0192424 A1* | 9/2004 | Mori | A63F 13/577 463/8 |
| 2004/0209684 A1* | 10/2004 | Hisano | A63F 13/10 463/32 |
| 2004/0259615 A1* | 12/2004 | Mori | A63F 13/10 463/3 |
| 2009/0247250 A1* | 10/2009 | Kato | A63F 13/837 463/2 |
| 2010/0245365 A1* | 9/2010 | Hato | A63F 13/577 345/473 |
| 2012/0115556 A1* | 5/2012 | Sogabe | A63F 13/5375 463/3 |
| 2015/0072745 A1* | 3/2015 | Sogabe | A63F 13/573 463/3 |
| 2019/0111344 A1* | 4/2019 | Hiroki | A63F 13/833 |
| 2020/0376380 A1* | 12/2020 | Abe | A63F 13/5252 |
| 2021/0154581 A1* | 5/2021 | Takafuji | A63F 13/58 |
| 2021/0154582 A1* | 5/2021 | Takafuji | A63F 13/44 |

FOREIGN PATENT DOCUMENTS

| | | | |
|---|---|---|---|
| JP | 6153985 B2 | 5/2017 | |
| JP | 6310517 B2 | 2/2018 | |

OTHER PUBLICATIONS

Japanese Office Action for corresponding JP Application No. 2019-210737, dated Jun. 8, 2021 (w/ English machine translation).

Chronoxiong Gaming, "Street Fighter V Ken vs Guile", YouTube [online][video], Especially 0:47-0:48, [retrieved on May 20, 2021], Retrieved from the Internet: <URL: https://www.youtube.com/watch?v=0m69ZVhRSfw>, See Cite No. 2.

Akihiro Kanaboshi, "What is the difference between fast and heavy punches in boxing?",[online], [retrieved on May 20, 2021], Retrieved from the Internet: <URL: https://ip.quora.com/%E3%83%9C%E3%82%AF%E3%82%B7%E3%83%B3%E3%82%B0%E3%81%AB%E3%81%8A%E3%81%91%E3%82%8B%E9%80%9F%E3%81%84%E3%83%91%E3%83%B3%E3%83%81%E3%81%A8%E9%87%8D%E3%81%84%E3%83%91%E3%83%B3%E3%83%81%E3%81%AE%E9%81%95%E3%81%84/answers/115929053>, See Cite Nos. 2 & 3.

Kazuki Yamada (President of Science Lab of the University of Tokyo), "Easy-to-understand explanation for the position vector (internal division/external division/Vector centroid)", Jan. 31, 2019, <URL: https://rlkellabo.com/positional-vector >, See Cite No. 2 (w/ English machine translation).

Japanese Office Action for corresponding JP Application No. 2019-210737, dated Nov. 2, 2021 (w/ English machine translation).

Notice of Allowance issued by the United States Patent and Trademark Office for the co-pending U.S. Appl. No. 16/953,343, dated Nov. 29, 2021.

Office Communication with Form PTO-892 Notice of References Cited issued by the United States Patent and Trademark Office for the co-pending U.S. Appl. No. 16/953,343, dated Dec. 22, 2021.

* cited by examiner

| STANDARD CHARACTER | CHARACTER ANIMATION DATA LOCATION | STANDARD PORTION OF STANDARD CHARACTER | OPPONENT PORTION OF OPPONENT CHARACTER | CAMERA ANIMATION DATA LOCATION | HIT TIMING |
|---|---|---|---|---|---|
| A | SLAPPING | PALM OF RIGHT HAND | PALM OF RIGHT HAND | CAMERA 3 | AFTER 0.23 SECONDS |
| B | KICK | LEFT TOE | CENTER PORTION OF TORSO | CAMERA 4 | AFTER 0.50 SECONDS |
| C | BITING | CALF | MOUTH | CAMERA 5 | AFTER 0.98 SECONDS |

FIG.3

NON-TRANSITORY COMPUTER-READABLE MEDIUM, DEVICE, AND METHOD FOR IMAGE GENERATION

CROSS-REFERENCE TO RELATED APPLICATIONS

This application claims priority to Japanese Patent Application No. 2019-210737, filed Nov. 21, 2019, which is hereby incorporated by reference in its entirety.

BACKGROUND

1. Field of the Disclosure

The present disclosure relates to an image generation program, an image generation processing device, and an image generation method.

2. Description of the Related Art

In a game operating on a computer, there is a scene in which a character attacks another character in heavy fighting actions of a battle between multiple characters.

In an event where characters come into contact with each other such as an attack scene, images of a desired scene are generated by causing each of the characters to perform a series of actions by using predetermined animation data.

Such animation data that causes each of multiple characters to perform a series of actions sometimes may fail to reproduce an appropriate scene because portions of the characters cannot hit each other at an appropriate timing when the size, body type, posture, and the like of each of the multiple characters are different from those assumed in the animation data.

For example, the following techniques can be given as conventional techniques for solving such problems.

There is a technique for a video game processing program that includes a function of calculating a degree at which an angle of the backbone of a character is to be corrected, based on: a predetermined timing indicating a timing at which an attack should hit an attack target in a series of actions; a posture of the character at this predetermined timing; and in-game coordinates of the attack target. The posture of the character is corrected depending on the correction of the backbone angle of the character based on the calculated degree. Then, animation is corrected to express a scene in which the attack of the character hits the attack target at the predetermined timing when the character executes the series of actions in the corrected character posture (for example, see Japanese Patent No. 6153985).

Moreover, when one character attacks another character by using a striking weapon or the like, a trajectory of the weapon needs to be changed depending on an evasive action (for example, ducking) or a weak point (for example, whether the weak point is a head portion or a leg portion) of the other character being the attack target to create a more realistic attack form. For this purpose, there is a technique that enables the same animation data to be used for different attack target positions by: obtaining basic trajectory data expressing a basic trajectory of a predetermined portion of the character moving on a predetermined virtual standard plane or along a predetermined virtual standard line segment; generating a corrected trajectory in which the basic trajectory is corrected by changing the angle of the virtual standard plane or the virtual standard line segment; and determining positions and postures of joints in a joint model with the predetermined portion moving along the corrected trajectory set as a point of origin (for example, see Japanese Patent No. 6310517).

SUMMARY

According to one aspect of the present disclosure, a non-transitory computer-readable medium storing an image generation program, when executed by a game apparatus, causes the game apparatus to perform a method. The method includes determining, in a scene including a timing of a hit of an attack in a battle between a plurality of characters in a game space, the timing of the hit, a predetermined portion of a predetermined character, and an opponent portion of an opponent character in the battle, from the predetermined character, the opponent character, and animation data that causes at least the opponent character to perform an action of the battle, the predetermined portion and the opponent portion being portions where the hit is supposed to occur; calculating a vector from the opponent portion to the predetermined portion at the timing of the hit; and generating an image of the scene by moving a position of the opponent portion in each of a plurality of frames included in the scene by using the vector such that the opponent portion hits the predetermined portion at the timing of the hit.

According to another aspect of the present disclosure, an image generation device includes a determination unit, a vector calculation unit, and an image generation unit. The determination unit, in a scene including a timing of a hit of an attack in a battle between a plurality of characters in a game space, determines the timing of the hit, a predetermined portion of a predetermined character, and an opponent portion of an opponent character in the battle, from the predetermined character, the opponent character, and animation data that causes at least the opponent character to perform an action of the battle, the predetermined portion and the opponent portion being portions where the hit is supposed to occur. The vector calculation unit calculates a vector from the opponent portion to the predetermined portion at the timing of the hit. The image generation unit generates an image of the battle by moving a position of the opponent character in each of a plurality of frames included in the scene by using the vector such that the opponent portion hits the predetermined portion at the timing of the hit.

According to further aspect of the present disclosure, an image generation method of causing a game apparatus to generate an image of a game space includes determining, in a scene including a timing of a hit of an attack in a battle between a plurality of characters in a game space, the timing of the hit, a predetermined portion of a predetermined character, and an opponent portion of an opponent character in the battle, from the predetermined character, the opponent character, and animation data that causes at least the opponent character to perform an action of the battle, the predetermined portion and the opponent portion being portions where the hit is supposed to occur; calculating a vector from the opponent portion to the predetermined portion at the timing of the hit; and generating an image of the battle by moving a position of the opponent character in each of a plurality of frames included in the scene by using the vector such that the opponent portion hits the predetermined portion at the timing of the hit.

BRIEF DESCRIPTION OF THE DRAWINGS

FIG. 3 is a diagram illustrating an example of a table defining relationships among characters, animation data, portions of characters in a hit, and the like.

DESCRIPTION OF THE EMBODIMENTS

Figure 1:
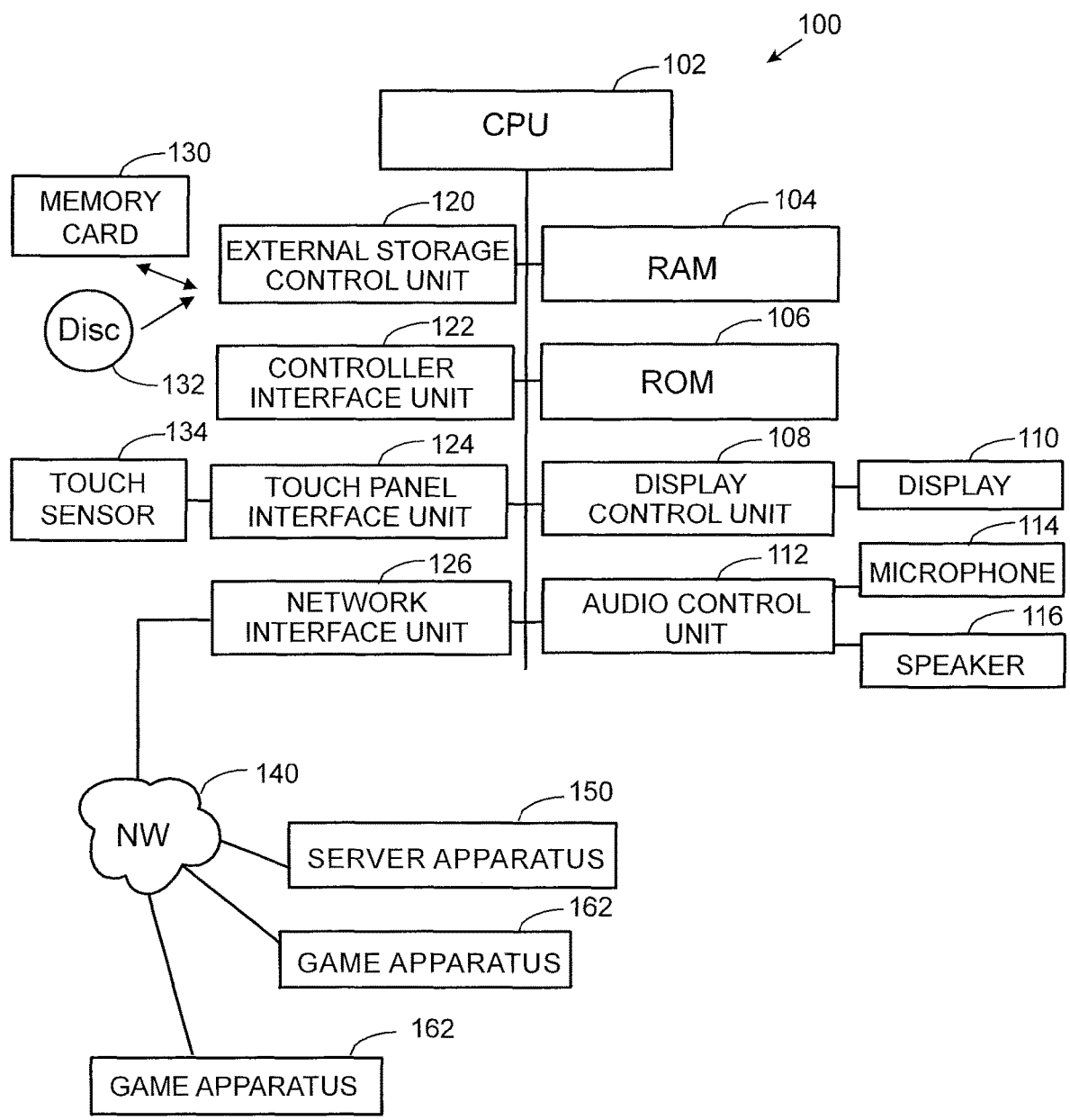
FIG. 1 is a diagram illustrating an example of a hardware configuration in one embodiment.

Various embodiments described below illustrate examples of the invention defined in the claims and do not limit the invention. Elements of programs in the embodiments can be also applied to elements of methods. Moreover, the programs may be stored in a non-transitory computer-readable storage medium. Furthermore, the elements for implementing the programs and the methods may be performed in different orders or performed in parallel as long as there is no contradiction. Moreover, the programs may be partially implemented by a general-purpose operating system, hardware, or the like.

The embodiments are not mutually exclusive. Accordingly, incorporation of part of one embodiment into another embodiment is also intended.

The embodiments are defined by specific technical elements for generating an image of a game.

Moreover, various characters in the embodiments may be player characters operable by a player or non-player characters not operable by a player. In the embodiments in which two or more characters are used to generate an image of a battle, at least one of the characters is desirably the player character operable by the player so that an operation by the player can be reflected in image generation.

Moreover, in the embodiments described below, description is given assuming that a character referred to as "opponent character" among the multiple characters is a character who makes an attack to achieve consistent description and facilitate understanding. However, the disclosed technique is not necessary limited to the case where the opponent character is the character who makes an attack as a matter of course.

Furthermore, animation data that causes a character to take a series of actions only needs to be applied to at least one of the multiple characters. Accordingly, the animation data does not have to be applied to some of the multiple characters involved in the battle.

Moreover, in the embodiment, a tem "hit" is used. The hit means a case where some of portions of at least two characters come into contact with or close to each other and one of the characters makes an impact (effect) on the other character. The moment when this hit occurs is referred to as hit timing.

In the embodiments, description is given by using a skeleton model to be described later. In the skeleton model, the hit is not limited to the case where a bone or a joint of one character comes into contact with a bone or a joint of another character. The hit may occur in portions of the character where there is no bone or joint such as the center of gravity of the character, a body surface portion away from the bone by a certain distance, and portions of clothes. Accordingly, the "portion" of the character in the following description does not have to be part of the bone or the joint of the character. Note that the portion may be defined as the entire character or any portion of the character instead of a certain portion of the character.

Moreover, the embodiments may be applied not only to the skeleton model but also to models other than the skeleton model.

Assume a case where the portion refers to a portion of a bone. In this case, when an image is generated by bringing a bone of one character into contact with a bone of another character at the hit timing, an unnatural image in which body surface portions of the two characters clip into each other is sometimes generated. In order to prevent generation of such an unnatural image, actions of the characters may be controlled such that the bodies of the characters do no overlap (clip into) each other at a moment when the surfaces of the two characters come into contact with each other. Such control can be achieved when data defining the characters includes data on distances from the bones to the body surfaces. Whether such control is to be performed or not depends on a performance of a machine to be used and those skilled in art can make the determination as appropriate. Although such overlapping of the characters is not described in the following description to facilitate understanding of the description, this is a matter to be considered as a matter of course.

Description is given below with reference to the drawings. In the drawings, the same or similar configurations are denoted by the same reference numerals. Note that repeated description for the configurations denoted by the same reference numerals is sometimes omitted to simply the description and facilitate understanding thereof.

FIG. 1 is a diagram illustrating an example of a hardware configuration in one embodiment. The embodiment is implemented in a game apparatus 100. Note that a program or a method executed by the game apparatus may be partially executed by a server apparatus 150 connected to the game apparatus 100 via a network NW 140.

The game apparatus 100 includes a CPU 102, a RAM 104, a ROM 106, a display control unit 108, an audio control unit 112, an external storage control unit 120, a controller interface unit 122, a touch panel interface unit 124, and a network interface unit 126.

A display 110 is connected to the display control unit 108 and an image generated in the embodiment is displayed on the display 110.

A microphone 114, a speaker 116, and the like are connected to the audio control unit 112. A program and data for implementing the embodiment may be stored in the RAM 104, the ROM 106, and a memory card 130 and a disk 132 connected to the external storage control unit 120. Note that other storage devices (not illustrated) may be connected to the external storage control unit 120. Moreover, the program or data for implementing the embodiment may be partially stored in the server apparatus 150.

A controller (not illustrated) that receives operation instructions from the player may be connected to the controller interface unit 122.

A touch sensor 134 installed in the display 110 or the like is connected to the touch panel interface unit 124. The game apparatus 100 may receive operation instructions from the player through the touch sensor 134.

The network NW 140 is connected to the network interface unit 126. A telephone line, a Wi-Fi, a near field communication device, or the like are connected to the network NW 140 and access to the Internet or the like is achieved. The server apparatus 150, game apparatuses 162 of other players, and the like may be connected to the network NW 140. The game apparatus 100 can communicate with the server apparatus 150 and multiple game apparatuses 162 via the network NW 140. The embodiment may be partially implemented in the server apparatus 150 or the game apparatuses 162. Various behaviors such as motions of some of the characters in the game may be controlled in the game apparatus 100 based on operations of the other players on the game apparatuses 162. An image of a battle game may be thereby generated in the game apparatus 100 with the multiple players operating their respective characters The CPU 102 can execute programs stored in the RAM 104, the ROM 106, the memory card 130, or the disk 132.

The hardware configuration illustrated in FIG. 1 illustrates an example of main pieces of hardware in the embodiment and pieces of hardware other than those described above may be connected.

Figure 2:
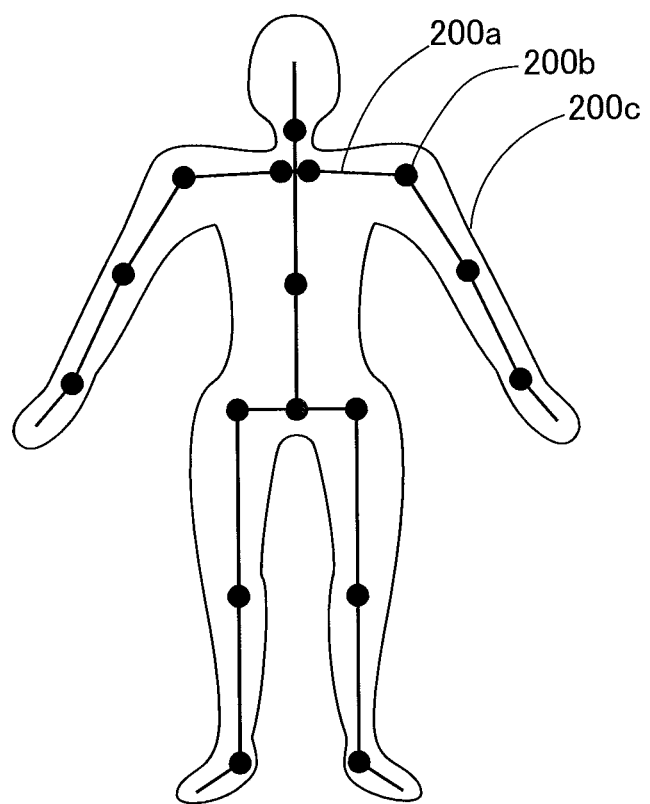
FIG. 2 is a view illustrating an example of a body type model of a character.

FIG. 2 illustrates a skeleton model as an example of a character controlled by a game program. Although the skeleton model of FIG. 2 represents a human figure, the character is not limited to a human figure. For example, when the character is an animal, a skeleton model of the animal may be used. The character may be a building, an object, or the like.

When the character or the like is to be moved, a skeleton model (FIG. 2) in which multiple bones 200a are connected to one another by joints 200b is sometimes used. Such a skeleton model may be used not only in a virtual space but also in cases where a target object is controlled in an actual space such as robot control.

The model described in this specification is formed of multiple bones 200a connected to one another in parent-child relationships as illustrated in FIG. 2, joints 200b, and a body surface 200c. Turning (bending, twisting) state of each joint can be expressed by a direction of a child bone based on a parent bone. A coordinate system (not illustrated) is defined for each bone to express the direction of the bone.

A line segment connecting original points of bones in a parent-child relationship is a bone.

In such a skeleton model used in control of a posture (pose, motion, and the like) of the character (human body, animal, structural object, or the like) in a three-dimensional (3D) virtual space or an actual space, it is necessary to control the position, angle, turning (bending, twisting), and the like of each of the bones and joints illustrated in FIG. 2 as intended. In the skeleton model illustrated in FIG. 2, the bones are coupled to one another at the joints and a motion of each bone affects motions of the other bones.

In the embodiment, the case where the skeleton model of FIG. 2 is used is given as an example. This skeleton model is obtained by creating a skeleton model of a structure of a human body, an animal, a structural object, or the like. Accordingly, for example, a movable range of the arm beyond the elbow has a certain limit. Causing the skeleton model to take a pose in which the arm is bent at an angle (bending, twisting) beyond this limit causes the skeleton model to be a model far from an actual human or animal. In order to generate a skeleton model that poses naturally as a human or an animal, it is necessary to put a certain limit to, for example, the movable range of the bone beyond the joint of the elbow.

For example, an action of the character may be controlled with the direction of the child bone with respect to the parent being expressed by using a rotating angle about each of three axes (x, y, z) based on the coordinate system of the parent bone.

The movable range of the joint may be set as follows: a certain point on a spherical surface having the joint as a center point is set as a focus; a plane orthogonal to an axis connecting the focus and the center point corresponding to the joint is set as a projecting plane; and the movable range of the joint is set on the projecting plane.

Moreover, when the direction of the child bone is not within the predetermined movable range or when an unnatural situation such as a situation where the arm of a certain character clip into the body of another character occurs, the direction of the child bone with respect to the parent bone may be corrected while a certain distance is maintained between the body surface and the bone or the joint such that the direction of the child bone satisfies conditions of the movable range depending on the shape.

The animation data described in the embodiment is data storing various parameters and the like of the bones and the joints of the skeleton model together with the time axis. The same animation data can be applied to characters having the same skeleton model or similar skeleton models. It is possible to apply the same animation data to characters whose skeleton models do not completely match each other and who varies in body type, initial pose, or size by handling some of the bones and the joints as one group or ignoring some of the bones and the joints as control targets and cause the different characters to perform similar series of actions to generate an image of a scene.

Note that the embodiment can be applied to models other than the skeleton model of FIG. 2 as a matter of course.

A functional block configuration of FIG. 4 executes processing of the embodiment described below.

FIG. 3 is a diagram illustrating an example of a definition table 300 defining relationships among characters, animation data, portions of characters in a hit, and the like.

In the table 300 of FIG. 3, for example, you can notice that a standard character A can perform an action of slapping animation and that a label attached to a location of an address where this animation data is stored is "slapping".

Moreover, it is found that a portion (standard portion) where the standard character A receives a hit of slapping in the action of slapping is the palm of the right hand and an opponent portion of the opponent character is the palm of the right hand. Here, the case where the opponent character slaps the standard character is defined. The other entries also define actions and the like of the characters and specific description thereof is omitted.

Moreover, you can notice that a label of a location where animation data of a virtual camera is stored on a memory is camera 3. Information indicating which of the standard character or the opponent character the virtual camera is to follow may be stored in the animation data of the virtual camera. Alternatively, data indicating that the virtual camera is fixed regardless of the positions of the characters may be stored in the animation data.

Furthermore, you can notice that the hit timing of slapping is 0.23 seconds after the start of the scene.

Note that the animation data may include animation of the characters after the hit. Alternatively, an action of each character after the hit may be implemented by simulating the degree of impact on the character and environments such as gravity and wind. In this specification, the technique of generation of images up to the hit is mainly described and those skilled in the art can select and carry out an appropriate method for the actions and behaviors of the characters after the hit.

As described above, the table 300 of FIG. 3 defines relationships among the animation data of each character, the position of a portion of the character where the hit occurs in the hit, the virtual camera, the hit timing, and the like. Note that the data stored in the table 300 is not limited to the aforementioned data. Moreover, the data illustrated in the table 300 does not have to be always present. For example, a timing at which an action of a portion of the standard character or the opponent character is greatest in motion data may be determined as the hit timing.

Although specific portions are specifically defined in the example of the table 300, when the portion where the hit occurs can be any portion of the body of the character, no specific portion has to be specified.

Moreover, a type of a skeleton model of each character may be defined. Motion data associated with the standard character can be used for an actual character having the same or similar skeleton model as a matter of course.

Figure 4:
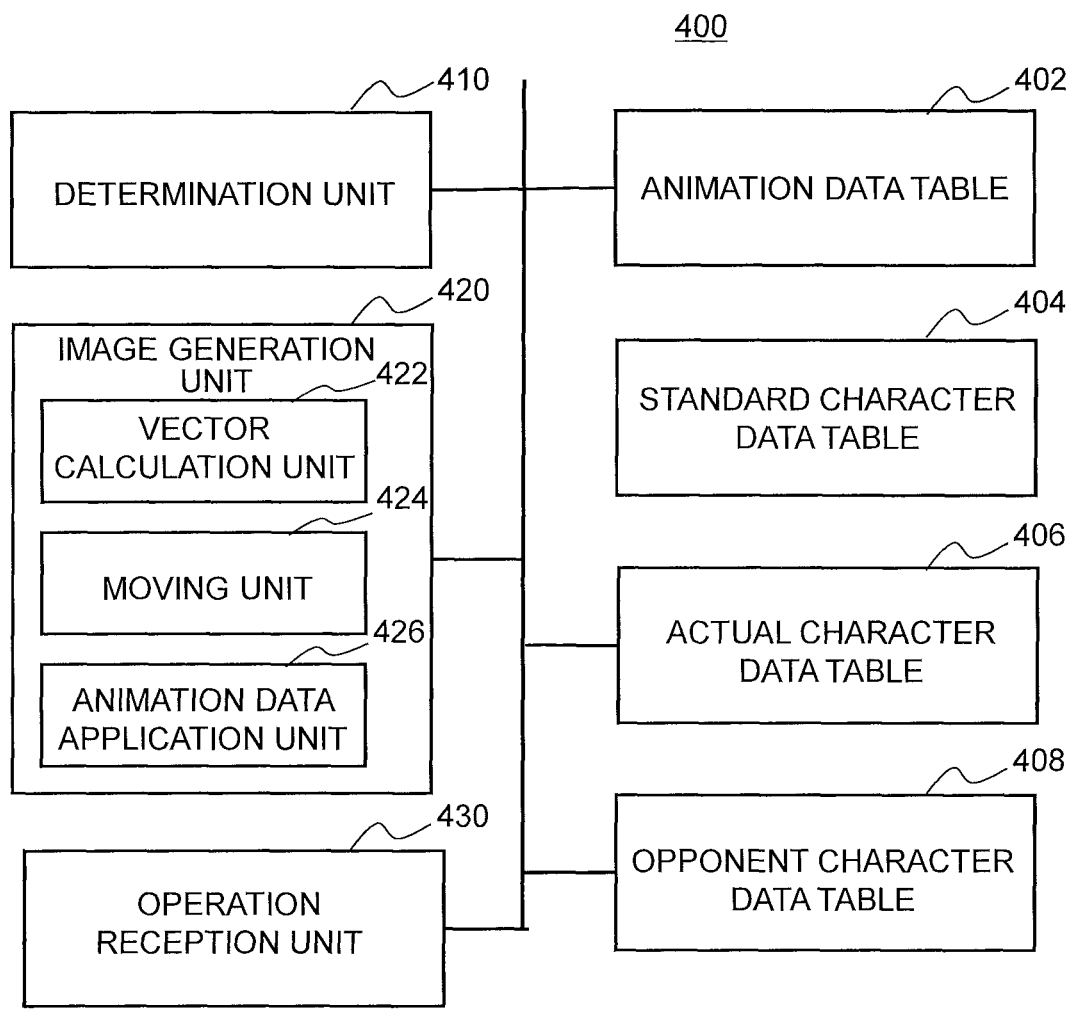
FIG. 4 is a diagram illustrating an example of a functional block diagram in one embodiment.

FIG. 4 is a diagram illustrating an example of a functional block diagram 400 in one embodiment relating to an image generation device. An animation data table 402 defines animation data defining a series of actions of one or multiple characters involved in a scene. The animation data may define a series of actions of two characters in the case where the two characters are in a battle. Alternatively, the animation data may be defined for only one of the characters (for example, an attacking character). In this case, the character for which no animation data is defined may be stationary or move depending on effects of environments such as gravity and wind, an instruction of the player, or the like. Note that, in the embodiment described below, an action caused by factors other than the animation data may be prohibited so that the hit can be applied to an appropriate portion. Alternatively, even when an animation action is changed in consideration of the action caused by factors other than the animation data, the animation action may be made to follow the change or cancel out the change to prevent shifting of the hit position. Note that the embodiments and the modified examples thereof described below include embodiments and examples that take action factors other than the animation data into consideration and those that do not. This point is referred to also when the embodiments and the modified examples thereof are described.

A standard character data table 404, an actual character data table 406, and an opponent character data table 408 define types of skeleton models of the respective characters, body types around the skeletons, and objects such as clothes worn by the characters. Note that the standard character and the actual characters are referred to as "predetermined character" in some cases in the embodiments described below.

A determination unit 410 in FIG. 4 determines the motion data, the characters involved, the portion of each character where the hit occurs, the hit timing, and the like before generation of an image of a scene. An image of a desired scene is generated by determining at least these pieces of information.

An image generation unit 420 includes a vector calculation unit 422, a moving unit 424, and an animation data application unit 426. The vector calculation unit 422 calculates a difference vector between position vectors of a portion of the standard character and a portion of the actual character involved in the hit to grasp that the portion of the standard character and the portion of the actual character are present at different position vectors. Moreover, the vector calculation unit 422 can apply the calculated difference vector to a timing included in a scene up to the hit by performing calculation such as proportionally dividing the calculated difference vector depending on the timing.

The moving unit 424, for example, adds or subtracts the position vector of the hit portion to or from the vector calculated by the vector calculation unit 422 to perform processing such as moving of the hit position.

The animation data application unit 426 does not only simply apply the animation data to the characters but also causes the characters to perform appropriate animation actions by controlling the postures of the characters while taking the aforementioned moving of the hit portion, presence of the fixed portions of the characters, and the like into consideration. Moreover, the animation data application unit 426 appropriately moves the virtual camera to generate an image.

An operation reception unit 430 receives operations from the player.

Note that information received from the other apparatuses via the network interface unit as illustrated in FIG. 1 is considered as a matter of course. Moreover, a function of generating sounds and the like and a function of collecting sounds and the like from the outside may be included. Note that the functions illustrated in FIG. 4 are examples of main functions and do not limit the embodiments.

Embodiment 1

Figure 5:
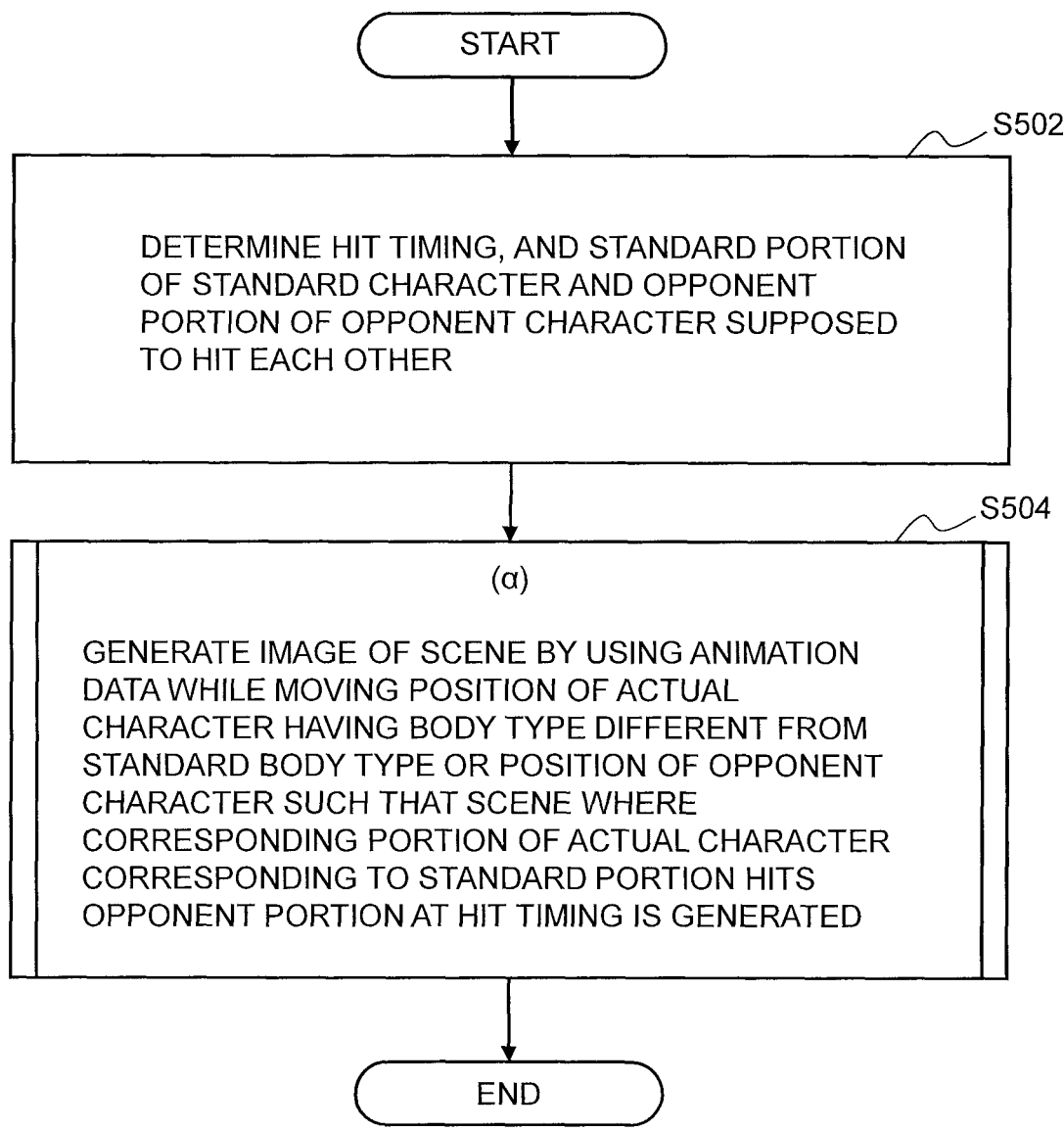
FIG. 5 is a diagram illustrating a flowchart of processing in Embodiment 1.

FIG. 5 is a diagram illustrating a flowchart of processing in Embodiment 1. Before description of FIG. 5, FIGS. 11A and 11B illustrating an example of a situation to be handled in Embodiment 1 are described.

Figure 11A:
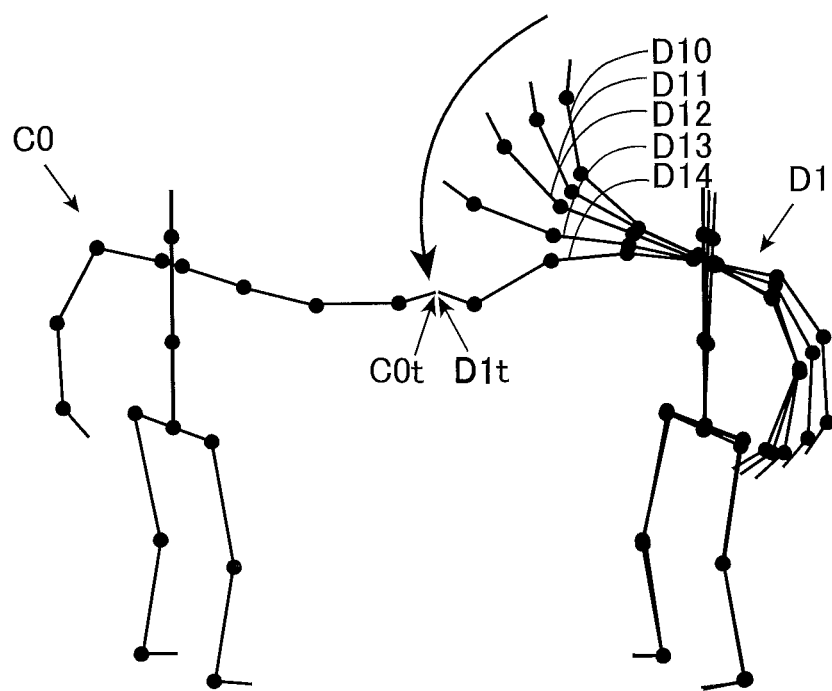
FIGS. 11A and 11B are views illustrating an example in which no hit occurs due to differences between a standard character and an actual character.
Figure 11B:
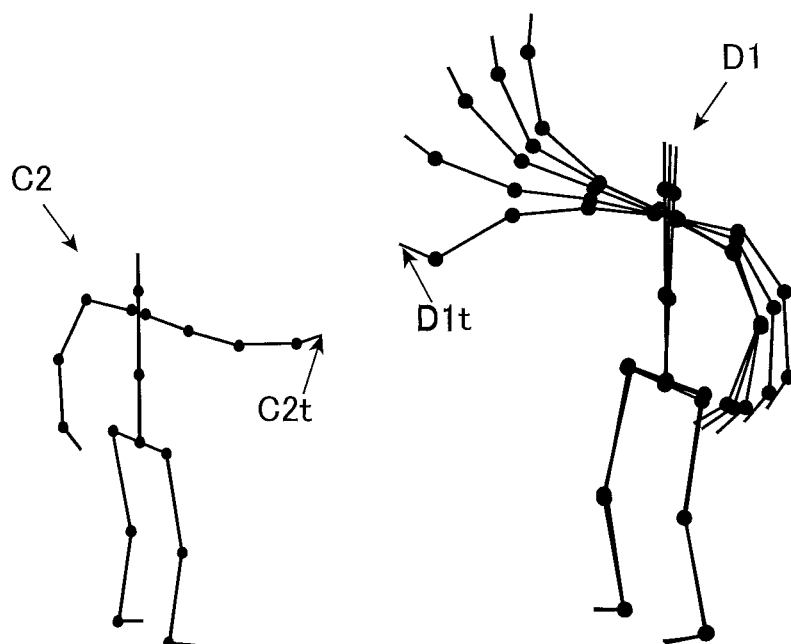

FIGS. 11A and 11B are views illustrating an example in which no hit occurs due to differences between the standard character and the actual character.

In FIG. 11A, a series of scenes of a hit is formed of frames at five timings and is illustrated by overlapping five frames.

FIG. 11A illustrates a state where an opponent character D1 brings down the right hand toward a standard character C0 and the palm D1*t* of the right hand of the opponent character D1 hits the palm C0*t* of the right hand of the standard character C0.

An action of the opponent character D1 bringing down the right hand is illustrated by a series of five opponent characters (opponent character D10 to opponent character D14). In an actual attack scene, video of, for example, 30 frames per second is generated. Accordingly, images of 16 frames including an initial frame are generated for a scene of a hit of ½ a second. Note that, in FIG. 11A, the number of frames is reduced and the scene is illustrated by five frames to be simplified.

As illustrated in FIG. 11A, the animation data is defined based on the sizes, body types, postures, and the like of the standard character and the opponent character.

FIG. 11B illustrates an example in which the animation data is applied to the opponent character D1 and an actual character C2 having a smaller body type than the standard character C0. In this case, since the actual character C2 has a smaller body type than the standard character C0, the palm D1*t* of the right hand of the opponent character D1 does not hit the palm C2*t* of the right hand of the actual character C2.

One of objects of the embodiments in this specification is to generate appropriate images of a scene by eliminating problems that occur when the animation data is applied such as a problem in which a hit that should occur does not occur between portions of characters when the animation data is applied as illustrated in FIGS. 11A and 11B.

Returning to FIG. 5, the flowchart of FIG. 5 is a flowchart schematically illustrating processing in Embodiment 1. Steps in this flowchart are described below.

In Step S502, at least the following information is determined in a scene including a timing of a hit of an attack in a battle between multiple characters in a game space. Specifically, a standard character having a standard body type, an opponent character in the battle, and animation data that causes at least one of the standard character and the opponent character to perform an action of the battle are used to determine the timing of the hit and also a standard portion of the standard character and an opponent portion of the opponent character where the hit will occur.

The game program that controls progress of the game selects the animation data to be currently used. Moreover, the game program determines at least the actual character and the opponent character appearing in the scene. The actual character is a character actually appearing in the scene and refers to a character who has different size, body type, posture, and the like from those of the standard character to which the animation data is applied as standard. Moreover, the opponent character refers to a character in a battle with the actual character. In order to help understanding of the embodiment, description is given assuming that the opponent character is a character to which the animation data is applied as standard. However, the opponent character may also have different size, body type, and posture from the standard character. The technique of this embodiment can be applied as it is also in this case as a matter of course.

In step S504, an image of a scene is generated by applying the animation data at least one of the opponent character and the actual character having a different body type from the standard body type. In this application, a position of the actual character or a position of the opponent character is moved so as to generate the scene where a corresponding portion of the actual character corresponding to the standard portion hits the opponent portion at the hit timing. Note that the actual character has a skeleton model corresponding to a skeleton model of the standard character and the same animation data as that for the standard character can be applied to the actual character.

The aforementioned processing achieves a hit of the corresponding portion of the actual character and the opponent portion of the opponent character at the hit timing.

Figures 12A, 12B, 12C:
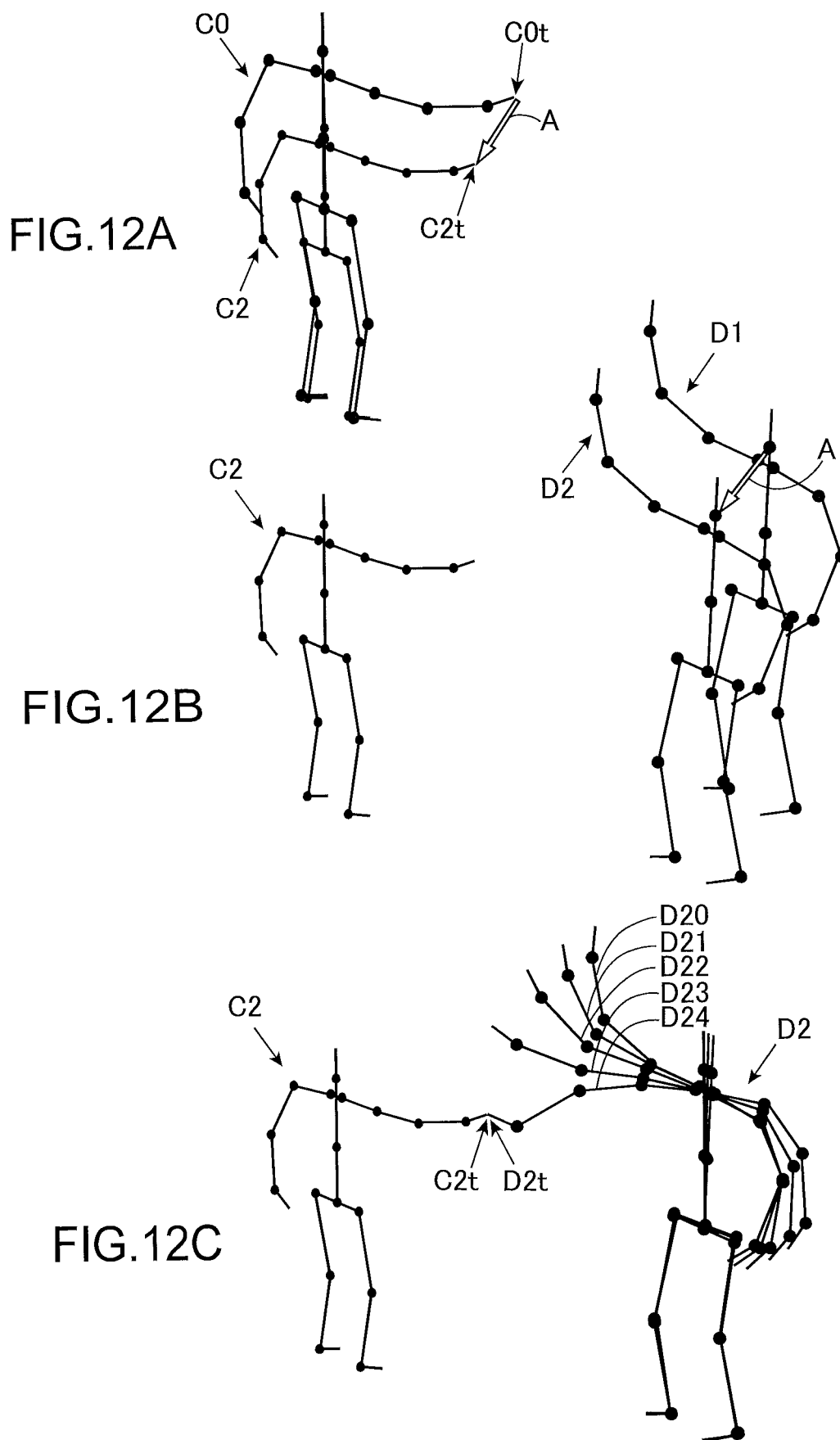
FIGS. 12A to 12C are views illustrating a specific example of Embodiment 1.

FIGS. 12A to 12C are views illustrating a specific example of Embodiment 1.

As illustrated in FIG. 12A, a vector A from a standard portion C0*t* that is the palm of the hand of the standard character C0 to a corresponding portion C2*t* of the actual character C2 is calculated. In this case, when the standard character and the actual character are to be moved based on the animation data, the vector A at the hit timing may be calculated.

When the characters move due to external factors (for example, environmental force such as gravity and wind, an action instruction made by the player, and the like) other than the animation data in a period to which the animation data is applied, it is desirable to take a motion of the corresponding portion of the actual character and a motion of the opponent portion of the opponent character into consideration. Handling of such cases is described later in a modified example of Embodiment 1.

As illustrated in FIG. 12B, the vector A is added to a position vector of the entire opponent character D1. The vector A is thereby added to a position vector of the opponent portion of the opponent character D1 and the position vector moves to a position vector of an opponent portion of an opponent character D2.

In FIG. 12C, an action of bringing down the right hand of the opponent character D2 achieved by applying the animation data to at least the opponent character D2 is illustrated by an action of a series of five opponent characters (opponent character D20 to opponent character D24).

Then, a hit of the corresponding portion C2*t* that is the palm of the hand of the actual character C2 and an opponent portion D2*t* that is the palm of the hand of the opponent character D24 occurs at the hit timing.

Even if the actual character C2 having different size, body type, posture, and the like from those of the standard character C0 is used, performing the aforementioned processing moves the opponent character D1 to the position of the opponent character D2 and enables obtaining of a scene including an appropriate hit at the hit timing.

Figure 13:
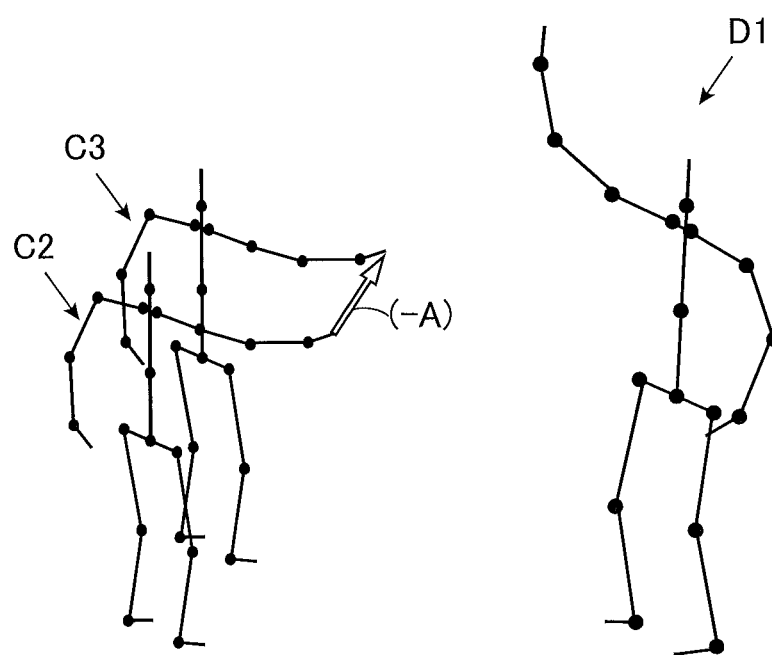
FIG. 13 is a view illustrating a specific example of Embodiment 1.

FIG. 13 illustrates that a hit can be surely achieved at the hit timing by moving the actual character C2 to an actual character C3 at a position obtained by subtracting the vector A from the position vector of the actual character C2 unlike in FIGS. 12A to 12C and applying the animation data to the actual character C3 and the opponent character D1. Note that the position of the opponent character at each timing is not illustrated in FIG. 13. Since this position is the same as that in the action of the opponent character D1 in FIG. 11, it is omitted.

Although the aforementioned moving is described by giving an example in which either the actual character C2 or the opponent character D1 is moved by the vector A, it is only necessary to move the positions of the actual character C2 and the opponent character D1 relative to each other based on the vector A and both characters may be thus moved.

Figure 6:
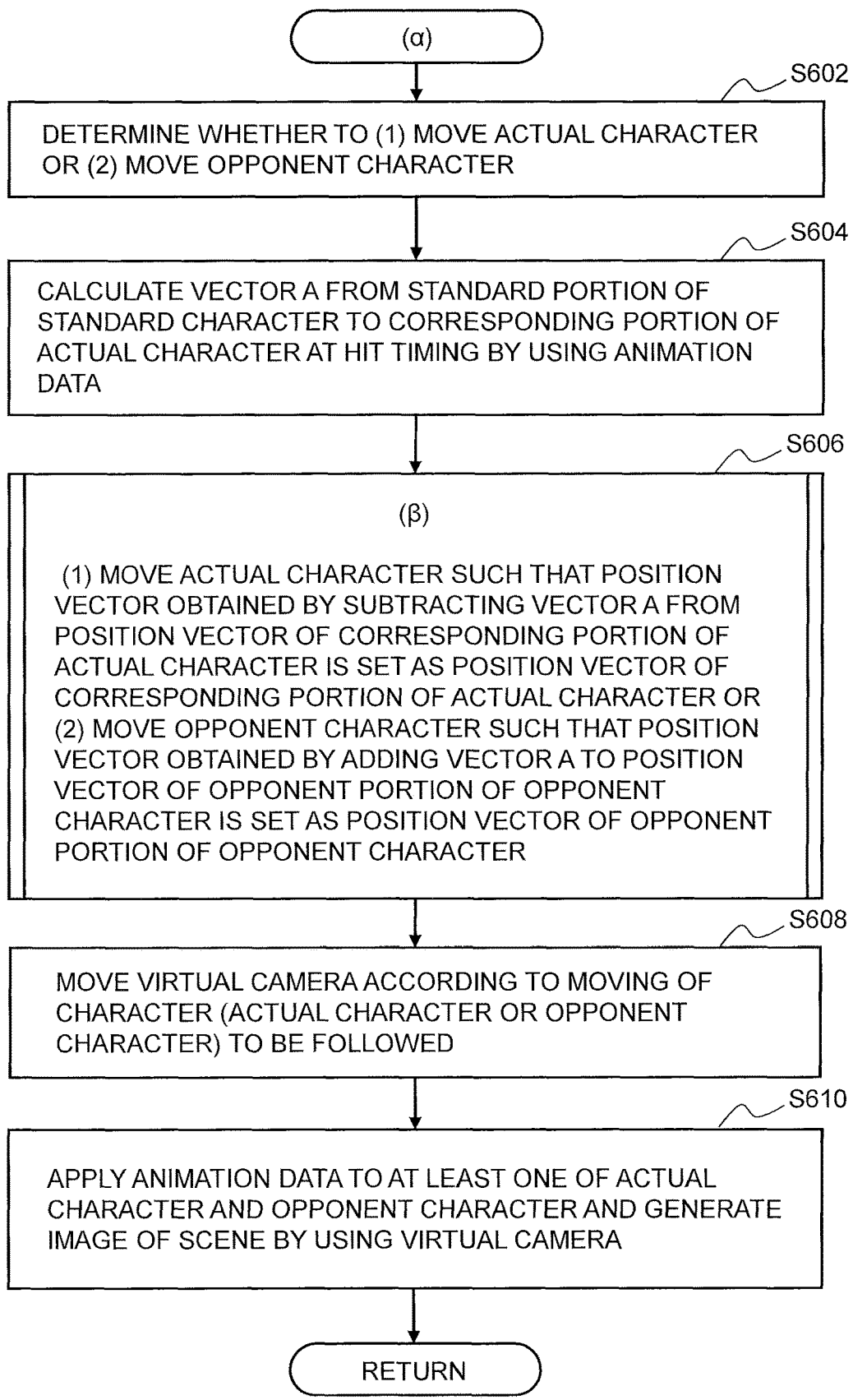
FIG. 6 is a diagram illustrating a flowchart of a specific example of image generation processing in Embodiment 1.

FIG. 6 is a flowchart illustrating details of step S504 in FIG. 5. FIG. 6 is described below in detail.

In step S602, whether to (1) move the actual character or (2) move the opponent character is determined. This determination is desirably made in advance in the game program. Alternatively, the player may specify (1) or (2). Note that a natural scene can be obtained in many cases by setting the smaller character as the character to be moved. Accordingly, the game program may select the smaller one of the characters in the battle as the character to be moved.

In step S604, the vector A from the standard portion of the standard character C0 to the corresponding portion of the actual character C2 at the hit timing is calculated by using the animation data.

In S606, (1) the actual character C2 is moved to the position of the actual character C3 such that the position vector obtained by subtracting the vector A from the position vector of the corresponding portion of the actual character C2 is set as the position vector of the corresponding portion of the actual character C3 or (2) the opponent character D1 is moved to the position of the opponent character D2 such that the position vector obtained by adding the vector A to the position vector of the opponent portion of the opponent character D1 is set as the position vector of the opponent portion of the opponent character D2.

In step S608, the virtual camera is moved according to the moving of the character (actual character or opponent character) to be followed. The case where the virtual camera fails to capture a scene to be captured can be prevented by translating the virtual camera in the same moving direction as the moving of the character (actual character or opponent character) to be followed without changing the direction of the line of sight of the virtual camera.

Note that, when the virtual camera is set not to follow the actual character or the opponent character and to capture an image at a wide angle of view, the moving of the virtual camera is not always necessary.

In step S610, the animation data is applied to at least one of the actual character and the opponent character and an image of the scene is generated by using the virtual camera.

An appropriate image of the scene is thus generated in the aforementioned processing.

Modified Example of Embodiment 1

Next, a modified example of aforementioned Embodiment 1 is described. Since the vector A at the hit timing is used in Embodiment 1, there is a case where the motion of the corresponding portion of the actual character and the motion of the opponent portion of the opponent character cannot be sufficiently taken into consideration when any of the characters moves due to external factors (for example, environmental force such as gravity and wind, an action instruction made by the player, and the like) other than the animation data in the middle of the scene. A hit cannot be sometimes appropriately achieved due to such external factors.

Figure 7:
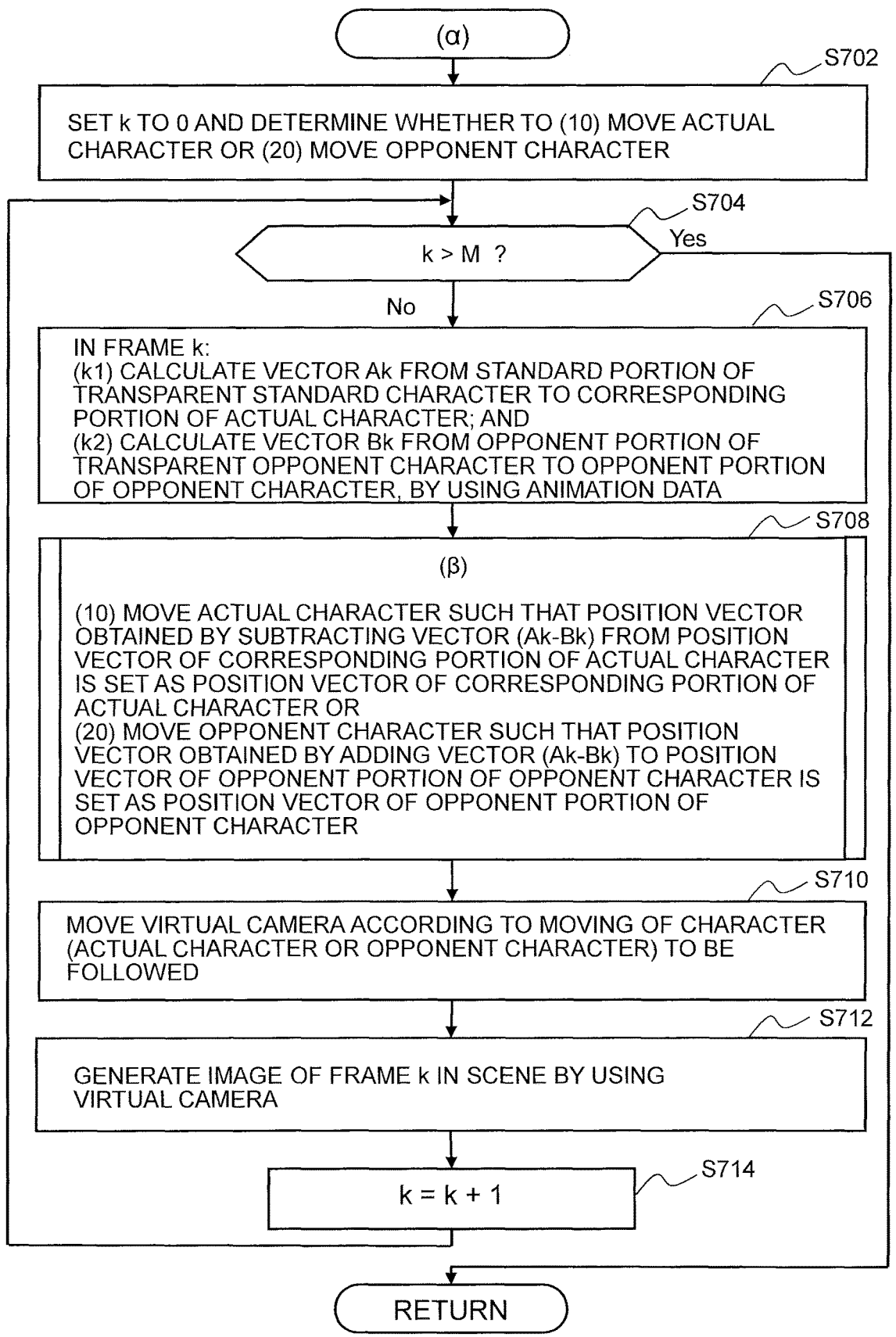
FIG. 7 is a diagram illustrating a flowchart of another specific example of the image generation processing in Embodiment 1.

FIG. 7 is a modified example of Embodiment 1 illustrating an example in which effects of such external factors (for example, environmental force such as gravity and wind, an action instruction made by the player, and the like) other than the animation data are taken into consideration at each timing to appropriately take the external factors into consideration.

Note that, when the embodiments are described by using video frame numbers in the specification and the drawings, the timings may be expressed by the video frame numbers. For example, when a frame at the start of animation is frame 0, the frame number is incremented one by one and the k-th frame is frame k. Note that, since a time interval between adjacent frames is constant, each frame number means a predetermined timing.

In step S702, the frame number to be processed is initialized and k is set to 0. Moreover, whether to (10) move the actual character or (20) move the opponent character is determined. The method of this determination is described in FIG. 6.

In step S704, whether k has exceeded M is checked. A frame M means a frame at which the hit occurs. When k has exceeded M, the processing is terminated. Note that to take an impact of the hit into consideration, additional animation data or simulation processing that causes the character to move in a form similar to a motion of an actual human or the like may be applied to a motion of the character after the hit. Processing after the hit is not affected by the present embodiment and those skilled in the art may apply appropriate action processing to the character.

When the determination result is yes in step S704, the processing is terminated. When the determination result is no, the processing proceeds to step S706.

In step S706, the following processing is performed at the frame k by using the animation data.

(k1) A vector Ak from a standard portion of a transparent standard character to the corresponding portion of the actual character is calculated and (k2) a vector Bk from an opponent portion of a transparent opponent character to the opponent portion of the opponent character is calculated. In this case, the transparent standard character and the transparent opponent character are characters in which the moving of positions due to the external factors (for example, environmental force such as gravity and wind, an action instruction made by the player, and the like) other than the animation data is not taken into consideration.

In step S708, (10) the actual character is moved such that a position vector obtained by subtracting a vector (Ak−Bk) from the position vector of the corresponding portion of the actual character is set as the position vector of the corresponding portion of the actual character or (20) the opponent character is moved such that a position vector obtained by adding the vector (Ak−Bk) to the position vector of the opponent portion of the opponent character is set as the position vector of the opponent portion of the opponent character.

This processing allows the aforementioned external factors to be taken into consideration.

In step S710, the virtual camera is moved according to the moving of the character (actual character or opponent character) to be followed.

In step S712, an image of the frame k in the scene is generated by using the virtual camera.

In step S714, k is incremented and the processing returns to step S704.

Performing the aforementioned processing corrects the position of the actual character or the opponent character appropriately at each frame while taking the moving of the position due to the external factors (for example, environmental force such as gravity and wind, an action instruction made by the player, and the like) other than the animation data into consideration and a natural, appropriate image is generated.

Figure 14A:
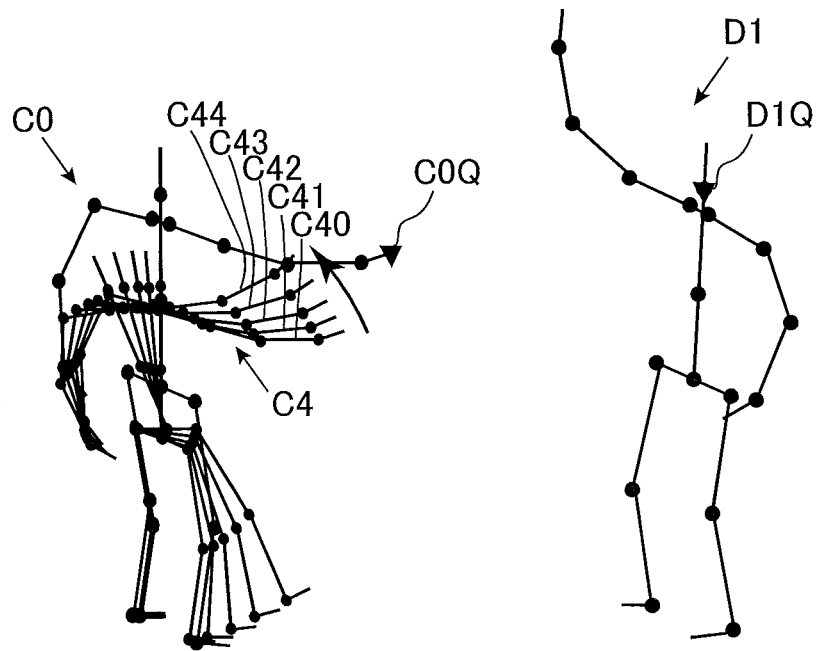
FIGS. 14A and 14B are views illustrating a modified example of Embodiment 1.
Figure 14B:
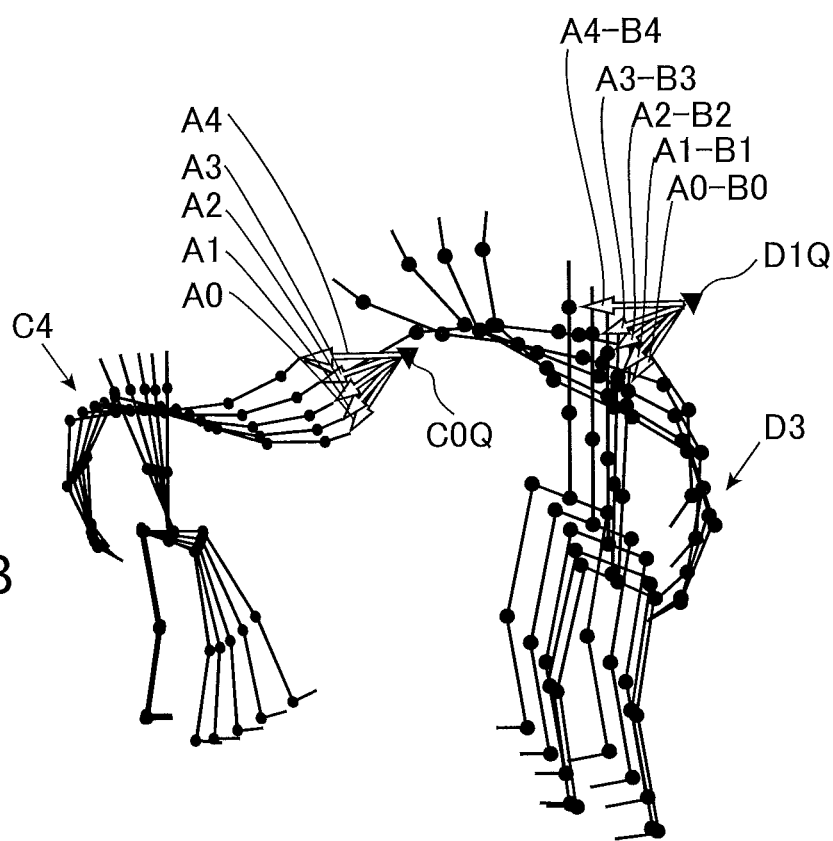

FIGS. 14A and 14B are views illustrating a modified example of Embodiment 1.

FIG. 14A illustrates the standard character C0 and the opponent character D1 at a frame 0. Moreover, FIG. 14A illustrates how the position of the actual character (actual characters C40 to C44) is moved due to the external factors (for example, environmental force such as gravity and wind, an action instruction made by the player, and the like) in frames k=0 to 4.

FIG. 14B illustrates a vector Ak (vector A0 to vector A4) from a standard portion C0Q of the standard character C0 to a corresponding portion of the actual character in each frame.

In order to simplify the description, it is assumed that the opponent character is not affected by the external factors (for example, environmental force such as gravity and wind, an action instruction made by the player, and the like) and a vector Bk (B0=B1=B3=B4) from the opponent portion of the transparent opponent character D1 to the opponent portion of the opponent character is equal to 0.

In this case, the vector Ak−Bk is vector A0 to vector A4. The opponent character at each timing is moved by using a corresponding one of these vectors. In FIG. 14B, the opponent character at each timing is moved by the vector (Ak−Bk) with a neck joint D1Q of the transparent opponent character D1 set as the point of origin.

Figure 15A:
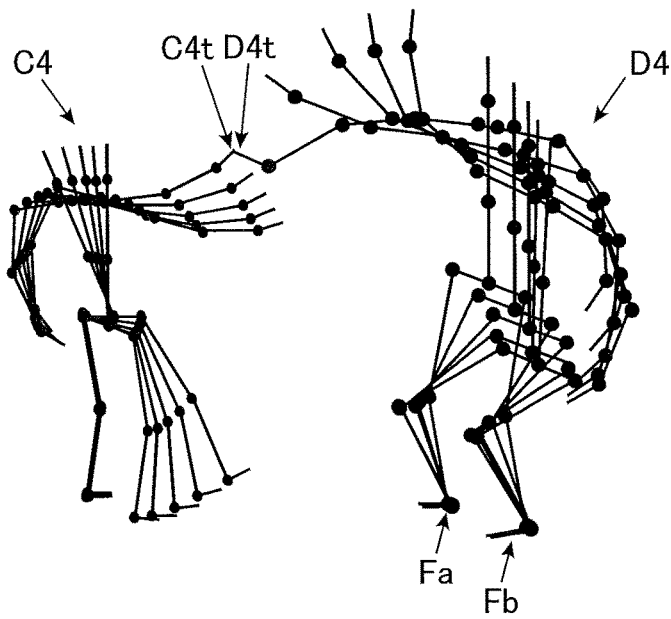
FIGS. 15A and 15B are views illustrating timings in the modified example of Embodiment 1 in which IK is applied with both feet of the opponent character fixed.
Figure 15B:
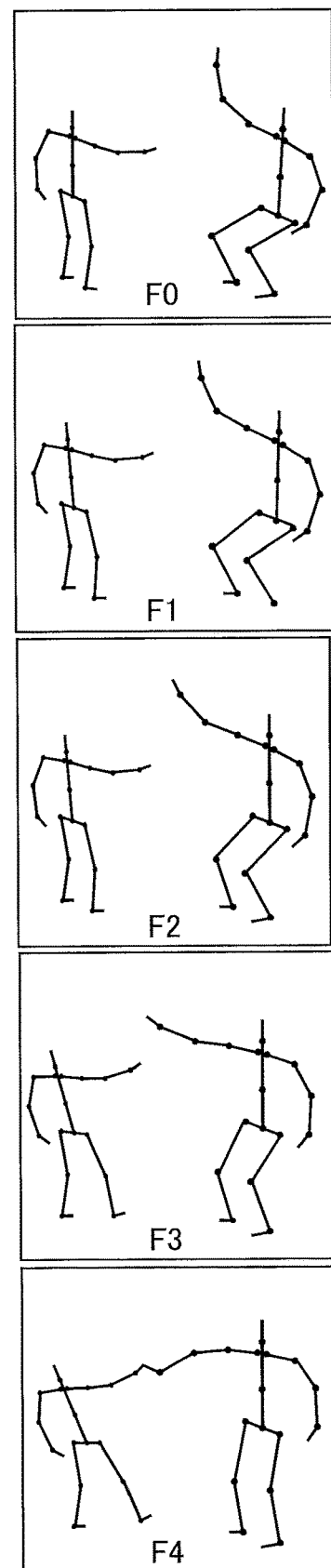

FIGS. 15A and 15B are views illustrating frames in the modified example of Embodiment 1 in which the posture of the opponent character is corrected by applying inverse kinematics (IK) with the positions of both feet (Fa, Fb) of the opponent character and the opponent portion of the opponent character fixed.

In FIG. 15A, you can notice that there is a hit of a corresponding portion C4t that is the palm of the right hand of the actual character and an opponent portion D4t that is the palm of the right hand of the opponent character D4.

FIG. 15B illustrates an example of generated images including the actual character C4 and the opponent character D4 in frames F0 to F4 where k=0 to 4.

Figure 8:
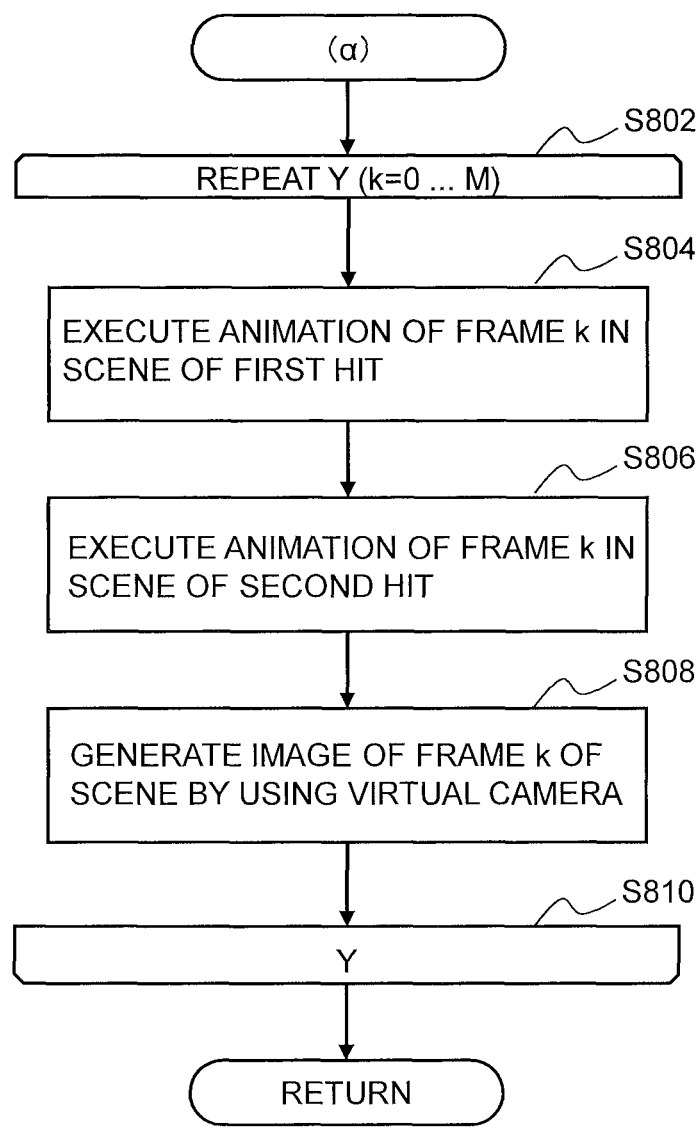
FIG. 8 is a diagram illustrating a flowchart of a specific example of the case where multiple hits occur substantially at the same time in Embodiment 1.

FIG. 8 is a diagram illustrating a flowchart of a specific example of the case where multiple hits occur substantially at the same time in Embodiment 1. When a scene includes multiple bits occurring at the same time and the multiple hits are hits involving different opponent characters, the positions of the multiple opponent characters are moved based on directions of moving and distances of moving that are obtained from the different opponent characters in a frame k of the scene. An image of the frame k is generated.

The aforementioned processing is executed by being repeated for a frame 0 to a frame M at the hit timing.

The following processing is executed repeatedly between step S802 and step S810 for each of the frames from the frame 0 to the frame M.

In step S804, animation of the frame k in a scene of a first hit is executed.

In step S806, animation of the frame k in a scene of a second hit is executed.

In step S808, an image of the frame k of the scene is generated by using the virtual camera.

The aforementioned processing can generate images included in a scene in which animations to be executed substantially at the same time are executed substantially at the same time.

Figure 9:
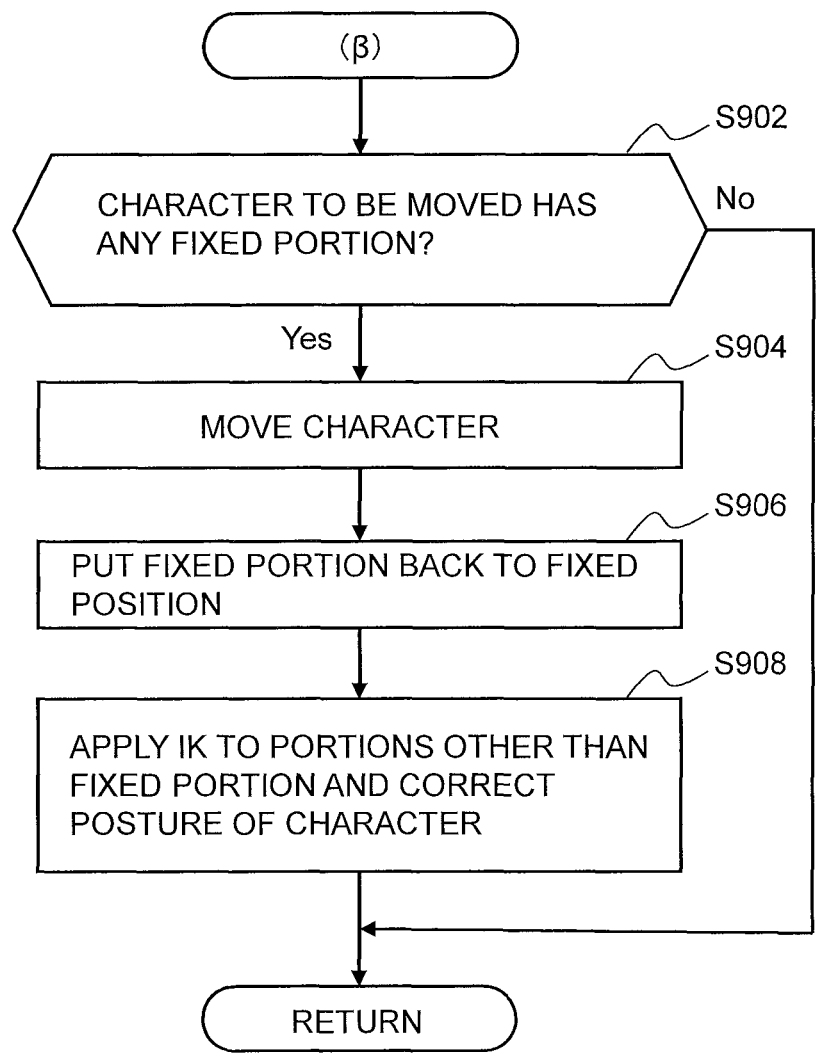
FIG. 9 is a diagram illustrating a flowchart of correction of a posture of a character.

FIG. 9 is a diagram illustrating a flowchart of correction of a posture of a character. For example, processing of preventing clipping of the feet of a character into the ground due to downward moving of the character is sometimes necessary. In such a case, the character is temporarily moved and then the feet of the character are disposed on the ground. This can be achieved by fixing the feet of the character and applying, for example, inverse kinematics to correct postures of the other portions of the characters.

When the moving distance of the character is great (for example, when the character jumps into the air and the feet cannot be disposed on the ground), a case where there is no other appropriate measure than to leave the character floating in the air may occur. Such a case may be handled by leaving the character floating in the air.

In step S902, whether the character to be moved has any fixed portion is determined. When the determination result is no, the processing is terminated. When the determination result is yes, the processing proceeds to step S904.

In step S904, the character is moved. Note that, in Embodiment 2, portions of the character are moved.

In step S906, processing of putting the fixed portions such as the toes back to the fixed position is performed.

In step S908, the inverse kinematics is applied to portions other than the fixed portions to correct the posture of the character. In this case, the processing is desirably performed such that the portion where the hit occurs is not moved.

The aforementioned processing can correct the posture of the moved character.

When the scene includes multiple hits occurring at substantially the same time and the multiple hits are hits involving different corresponding portions of the actual character, the position of the actual character or the opponent character is moved based on average values of directions of moving and distances of moving that are obtained from the different corresponding portions.

Figure 10:
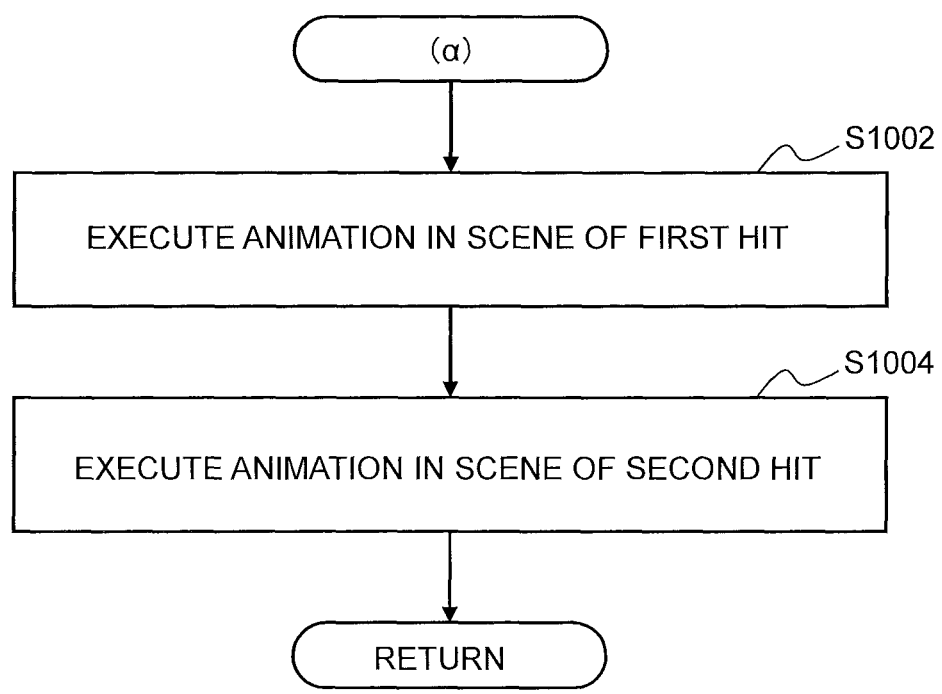
FIG. 10 is a diagram illustrating processing performed when multiple hits consecutively occur.

FIG. 10 is a diagram illustrating processing performed when multiple hits consecutively occur.

In step S1002, animation in a scene of a first hit is executed.

In step S1004, a state of a timing of the first hit is set as an initial state and then animation in a scene of a second hit is executed.

The aforementioned processing allows execution of appropriate image generation processing for consecutive hits.

As described above, when the animation data is to be applied to multiple characters, the animation data is appropriately applied, allowing the multiple characters to perform an appropriate series of actions even if the multiple characters vary in size, body type, posture, and the like.

Embodiment 2

Figure 16:
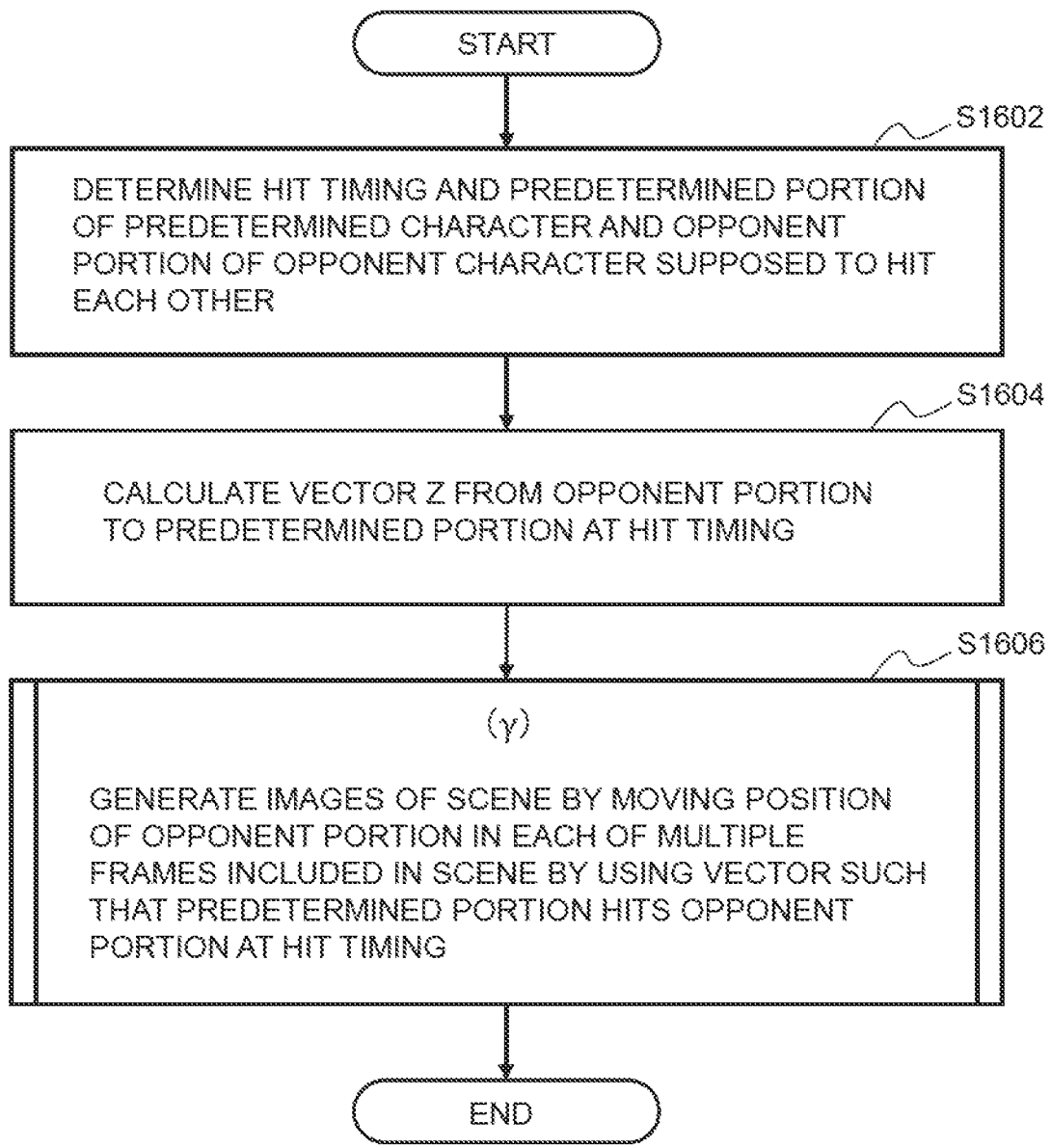
FIG. 16 is a diagram illustrating a flowchart of processing in Embodiment 2.

FIG. 16 is a diagram illustrating a flowchart of processing in Embodiment 2. In Embodiment 2, control is performed such that a hit of a predetermined portion of a predetermined character and an opponent portion of an opponent character occurs at a hit timing. In this case, a vector from the opponent portion to the predetermined portion at the hit timing is used. Then, for example, the position of the opponent portion of the opponent character is controlled at each timing such that this vector becomes zero at the hit timing.

Although the position of the entire character is moved in Embodiment 1 described above, in Embodiment 2, a portion of the character is moved and the posture of the character is corrected along with the moving of this portion by using the inverse kinematics to obtain an image of a scene in which a hit occurs in a posture as natural as possible.

The flowchart of FIG. 16 is described.

In step S1602, a timing of a hit, and the predetermined portion of the predetermined character and the opponent portion of the opponent character where the hit is supposed to occur are determined.

In step S1604, a vector Z from the opponent portion to the predetermined portion at the hit timing is calculated.

Figure 17:
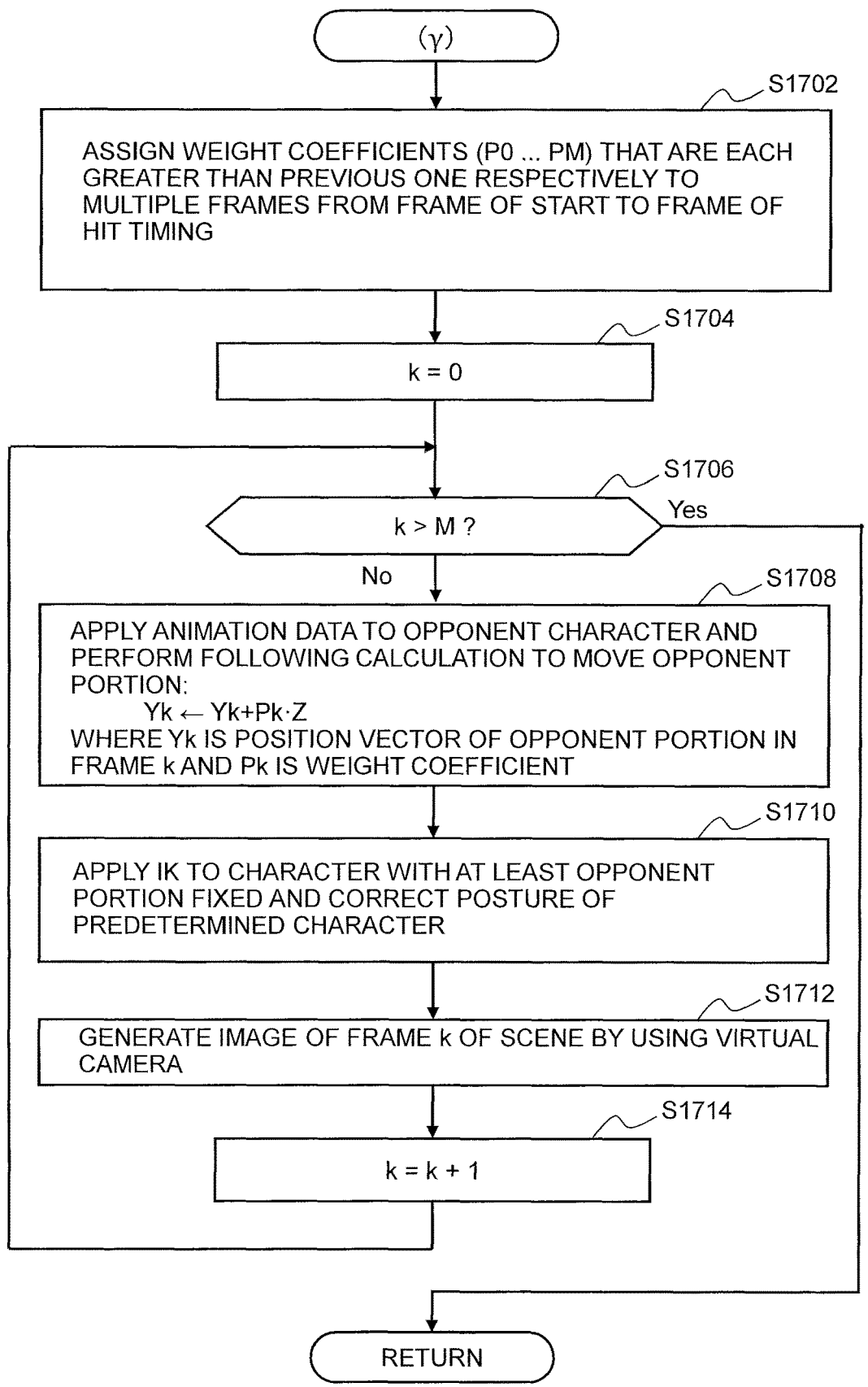
FIG. 17 is a diagram illustrating a flowchart of a specific example of image generation processing in Embodiment 2.

In step S1606, an image of the scene is generated by moving the position of the opponent portion at each of multiple timings included in the scene by using the vector such that the predetermined portion hits the opponent portion at the hit timing FIG. 17 is a diagram illustrating a flowchart of a specific example of the image generation processing in Embodiment 2.

An example of specific processing in the image generation processing of Embodiment 2 is described below.

In step S1702, the processing is assumed to be performed for a scene including a timing of a hit of an attack in a battle between multiple characters in a game space as in Embodiment 1. Weight coefficients (P0, . . . , PM) that are each greater than the previous weight coefficient are assigned respectively to multiple frames from a frame of start to a frame of the hit timing.

In step S1704, a timing k is initialized (K=0). Then, the vector from the opponent portion to the predetermined portion at the hit timing is calculated.

In step S1706, whether k has exceeded M is checked. A frame M means a frame at which the hit occurs. When k has exceeded M, the processing is terminated. Note that to take an impact of the hit into consideration, additional animation data or simulation processing that causes the character to move in a form similar to a motion of an actual human or the like may be applied to a motion of the character after the hit. Processing after the hit is not affected by the present embodiment and those skilled in the art may apply appropriate action processing to the character.

In step S1708, the animation data is applied to the opponent character. Since the vector Z is already calculated, the following calculation is performed to move the opponent portion:

$$Y_k \leftarrow Y_k + P_k \cdot Z$$

where $Y_k$ is the position vector of the opponent portion in the frame k and $P_k$ is the weight coefficient.

In step S1710, the inverse kinematics is applied to the character with at least the opponent portion fixed and the posture of the predetermined character is corrected.

In step S1712, an image of the frame k of the scene is generated by using the virtual camera.

In step S1714, k is incremented.

In the aforementioned processing, the position of the opponent portion at each timing is corrected and the posture of the opponent character is also corrected by using the inverse kinematics.

Figure 18:
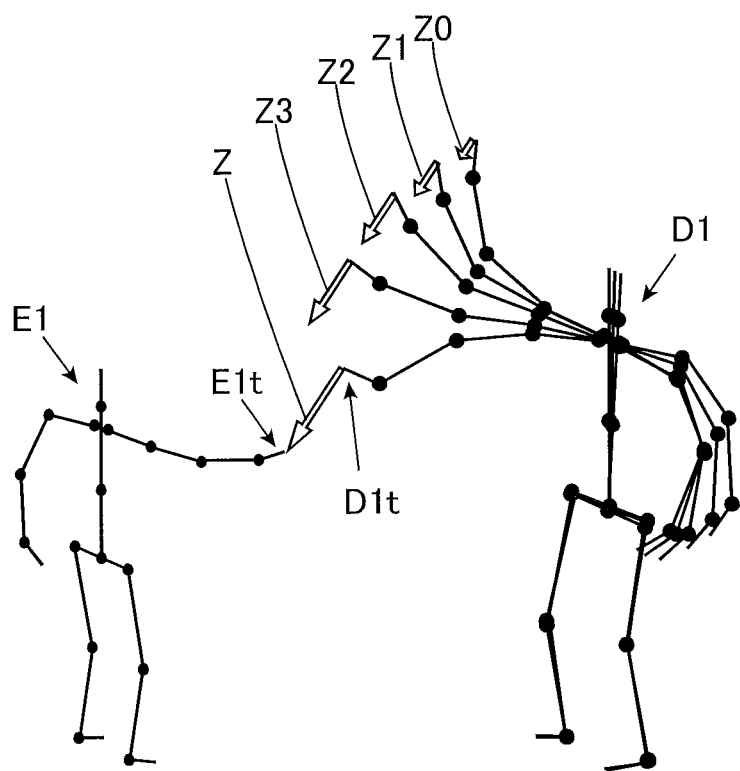
FIG. 18 is a view illustrating a specific example of Embodiment 2.

FIG. 18 is a view illustrating a specific example of Embodiment 2. In the frame of a hit, there should be a hit of a predetermined portion E1$t$ that is the palm of the right hand of a predetermined character E1 and an opponent portion D1$t$ that is the palm of the right hand of an opponent character D1. However, the predetermined portion E1$t$ and the opponent portion D1$t$ are away from each other by the vector Z.

Processing of moving the position of the opponent portion of the opponent character in each frame by a corresponding one of vectors Z0, Z1, Z2, Z3, and Z is thus performed. The vectors Z0, Z1, Z2, Z3, and Z are preferably vectors that are each set to be greater than the previous vector by being multiplied by weight coefficients of a monotone increase function. Since the vector Z is added to the position vector of the opponent portion in the frame of the impact, the opponent portion D1$t$ hits the predetermined portion E1$t$.

Moreover, in the beginning, the opponent portion is desirably moved by using Z0 multiplied by a small weight coefficient. This can avoid the case where the opponent portion is moved greatly at an initial timing. In addition, since the opponent portion D1$t$ hits the predetermined portion E1$t$ at the timing of impact that is the last timing, the action of the opponent character is smooth. Moreover, the posture of the opponent character can be made more natural by correcting the posture by applying the inverse kinematics to the opponent portion of the opponent character in the moving of the opponent portion using these vectors.

Figure 19A:
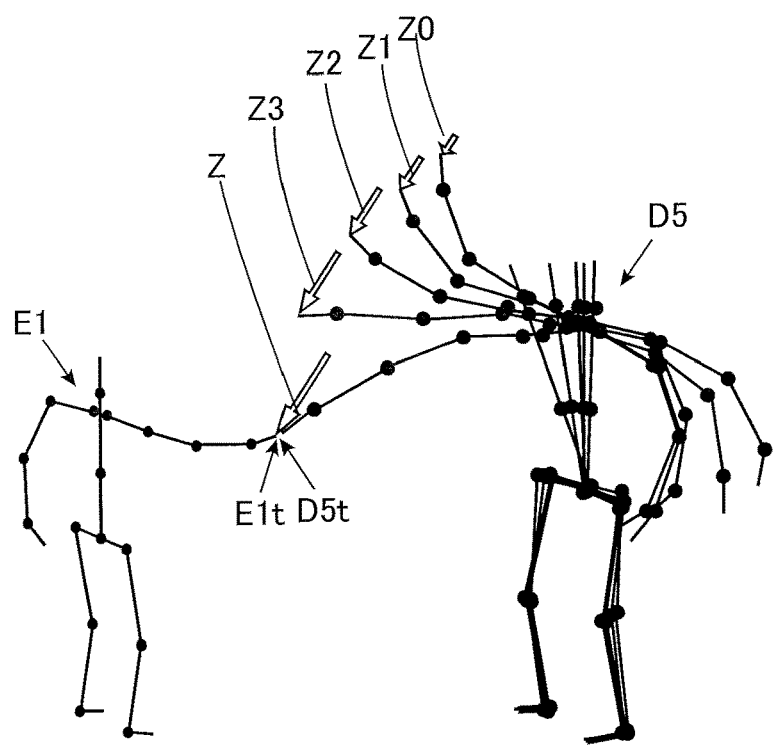
FIGS. 19A and 19B are views illustrating timings in a modified example of Embodiment 1.
Figure 19B:
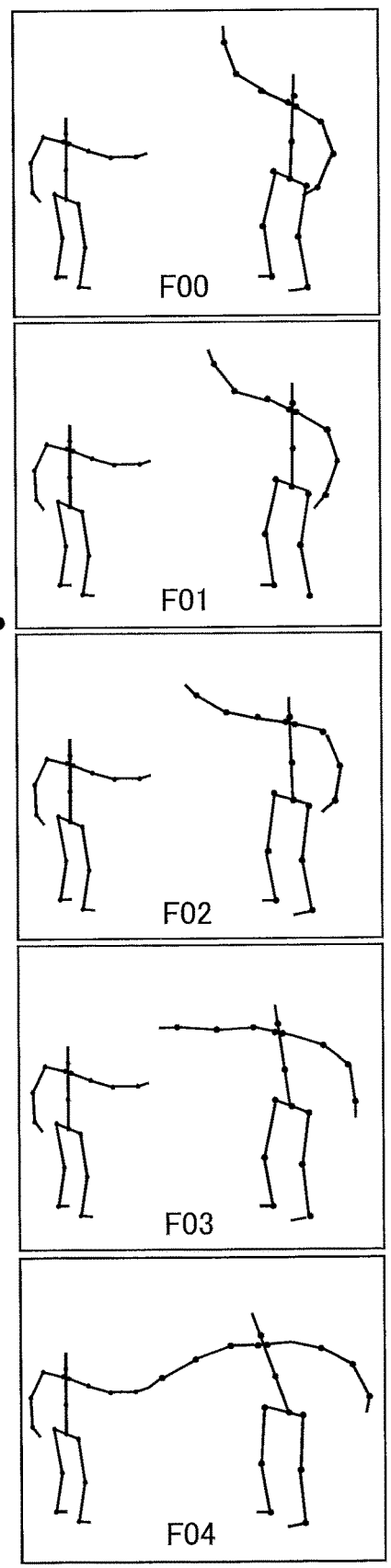

FIGS. 19A and 19B are views illustrating frames in a modified example of Embodiment 1.

In FIG. 19A, the opponent characters obtained when the opponent portions are moved and the inverse kinematics is then applied are illustrated to overlap one another. Then, an appropriate hit of a predetermined portion E1$t$ and an opponent portion D5$t$ occurs in the hit frame.

FIG. 19B illustrates an example of generated images including a predetermined character E1 and an opponent character D5 in the frames F00 to F04 where k=1 to 4.

As described above, when the animation data is to be applied to multiple characters, the animation data is appropriately applied, allowing the multiple characters to perform an appropriate series of actions even if the multiple characters vary in size, body type, posture, and the like.

Those skilled in the art will understand that at least some of the exemplary embodiments disclosed herein may be used independently from one another and/or in combination with one another and may have applications to devices and methods not disclosed herein.

Those skilled in the art will also appreciate that embodiments may provide one or more advantages, and not all embodiments necessarily provide all or more than one particular advantage as set forth herein. Additionally, it will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:

1. A non-transitory computer-readable medium storing an image generation program, when executed by a game apparatus, causing the game apparatus to perform a method, the method comprising:
    determining, in a scene including a timing of a hit of an attack in a battle between a plurality of characters in a game space, the timing of the hit, a predetermined portion of a predetermined character, and an opponent portion of an opponent character in the battle, from the predetermined character, the opponent character, and animation data that causes at least the opponent character to perform an action of the battle, the predetermined portion and the opponent portion being portions where the hit is supposed to occur;
    calculating a vector from the opponent portion to the predetermined portion at the timing of the hit; and
    generating an image of the scene by moving a position of the opponent portion in each of a plurality of frames included in the scene by using the vector such that the opponent portion hits the predetermined portion at the timing of the hit.

2. The non-transitory computer-readable medium according to claim 1, wherein the generating an image includes:
    assigning weight coefficients that are each greater than the previous weight coefficient respectively to the plurality of frames from the frame of start to the frame of the timing of the hit; and
    at a timing of each of the plurality of frames, moving the opponent portion by subtracting the vector multiplied by the weight coefficient for the timing from a position vector of the opponent portion after application of the animation data to the opponent character, and correcting a posture of the opponent character by applying inverse kinematics to the opponent character with at least the opponent portion fixed.

3. The non-transitory computer-readable medium according to claim 1, wherein the animation data includes information on the timing of the hit, the predetermined portion, and the opponent portion.

4. The non-transitory computer-readable medium according to claim 1, wherein the determining includes determining a timing at which moving speed of the predetermined portion or the opponent portion is highest in the animation data as the timing of the hit.

5. The non-transitory computer-readable medium according to claim 1, wherein the determining includes determining that the predetermined portion of the predetermined character is a predefined portion of a character that is present in a field of view in a direction of line of sight of the opponent character and that is the closest to the opponent character.

6. An image generation device comprising:
a determination unit that, in a scene including a timing of a hit of an attack in a battle between a plurality of characters in a game space, determines the timing of the hit, a predetermined portion of a predetermined character, and an opponent portion of an opponent character in the battle, from the predetermined character, the opponent character, and animation data that causes at least the opponent character to perform an action of the battle, the predetermined portion and the opponent portion being portions where the hit is supposed to occur;

a vector calculation unit that calculates a vector from the opponent portion to the predetermined portion at the timing of the hit; and an image generation unit that generates an image of the battle by moving a position of the opponent character in each of a plurality of frames included in the scene by using the vector such that the opponent portion hits the predetermined portion at the timing of the hit.

7. An image generation method of causing a game apparatus to generate an image of a game space, the method comprising:

determining, in a scene including a timing of a hit of an attack in a battle between a plurality of characters in a game space, the timing of the hit, a predetermined portion of a predetermined character, and an opponent portion of an opponent character in the battle, from the predetermined character, the opponent character, and animation data that causes at least the opponent character to perform an action of the battle, the predetermined portion and the opponent portion being portions where the hit is supposed to occur;

calculating a vector from the opponent portion to the predetermined portion at the timing of the hit; and generating an image of the battle by moving a position of the opponent character in each of a plurality of frames included in the scene by using the vector such that the opponent portion hits the predetermined portion at the timing of the hit.

* * * * *